United States Patent [19]

Takeuchi et al.

[11] Patent Number: 5,007,747
[45] Date of Patent: Apr. 16, 1991

[54] RADIAL ROLLER BEARING

[75] Inventors: Masamichi Takeuchi; Yasuo Asai, both of Osaka, Japan

[73] Assignee: Koyo Seiko Co., Ltd., Osaka, Japan

[21] Appl. No.: 526,883

[22] Filed: May 22, 1990

[30] Foreign Application Priority Data

May 22, 1989 [JP] Japan .............................. 1-58921[U]

[51] Int. Cl.⁵ ............................................. F16C 33/58
[52] U.S. Cl. ................................... 384/450; 384/462; 384/571; 384/568; 384/564; 384/565
[58] Field of Search ............... 384/450, 462, 571, 568, 384/565, 564, 548

[56] References Cited

U.S. PATENT DOCUMENTS

| 3,963,285 | 6/1976 | Kellström | 384/450 |
| 4,227,754 | 10/1980 | Kellström | 384/450 |
| 4,828,404 | 5/1989 | Takata | 384/571 |
| 4,929,098 | 5/1990 | Takata et al. | 384/568 |

Primary Examiner—Lenard A. Footland
Attorney, Agent, or Firm—Birch, Stewart, Kolasch & Birch

[57] ABSTRACT

A radial roller bearing consisting of rings and rollers, either the rolling contact surface of each roller or the raceway surfaces of the rings or both are crowned, the amount of crowning which is defined as $\Delta t/l$ i.e., the depth of crowning $\Delta t$ to the effective roller length of $l$, is set to 0.0007 to 0.002, the ring has a rib at its one end, the end surface of each roller which makes contact with the rib is spherically convex, while the contacted surface of the rib is spherically concave.

5 Claims, 4 Drawing Sheets

F I G. 3
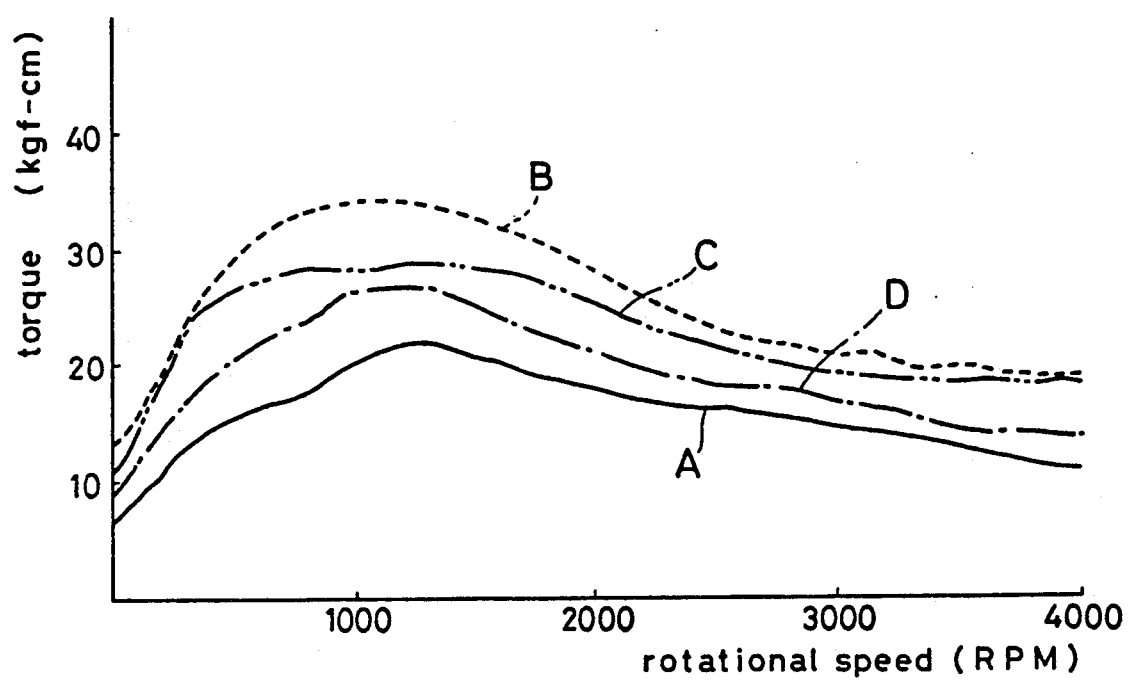

RADIAL ROLLER BEARING

BACKGROUND OF THE INVENTION

The present invention relates to improvements in the torque characteristics and the heat generation characteristics of a radial roller bearing, such as a tapered roller bearing.

Usually, a tapered roller bearing comprises an inner ring having a cone back face rib, an outer ring mounted opposite to the inner ring, and tapered rollers disposed between the inner and outer rings. When the tapered roller bearing is used, the rolling contact surfaces of the tapered rollers make contact with the raceway surfaces of the inner and outer rings. Also, a larger end face of each tapered roller makes contact with the surface of the cone back face rib of the inner ring. If the degree to which these portions make contact with each other is not maintained appropriately, then the running torque increases as a result of high frictional resistance. Also, the amount of heat frictionally produced initially increases.

The aforementioned degree to which the rolling contact surfaces of the tapered rollers make contact with the raceway surfaces of the inner and outer rings can be adjusted by crowning the rolling contact surfaces of the tapered roller or the raceway surface of the inner or outer ring that makes contact with the rolling contact surfaces of the tapered rollers. The amount of crowning is given by $\Delta t/l$ i.e., the ratio of the depth of crowning $\Delta t$ to the effective roller length of $l$. As the amount $\Delta t/l$ increases, a point contact is approximated, and the degree of contact reduced. Where the amount of $\Delta t/l$ is small, a line contact is approximated, and the degree of contact increases. Accordingly, increasing the amount of crowning $\Delta t/l$ would be contemplated to reduce frictional resistance. However, if the amount of crowning $\Delta t/l$ becomes too large, then the tapered rollers are spaced a large distance from the inner and outer rings. This results in a thick film of oil, which in turn increases the viscous resistance.

In the past, the inner surface of the cone back face rib had been finished roughly and so this surface provides a large coefficient of friction. The, large frictional resistance is produced between the end surface of each tapered roller and the surface of the cone back face rib. This also increased the torque and the amount of heat produced initially. Especially, if the tapered rollers are spaced a large distance from the inner and outer rings to form a thick film of lubricating oil, thereby increasing the viscous resistance as described above, the tapered rollers are skewed by the viscous resistance. At this time, the surface of the cone back face rib drags the large end faces of the tapered rollers, producing larger frictional resistance.

SUMMARY OF THE INVENTION

In view of the foregoing circumstances, the present invention has been made. The invention is intended to provide a tapered roller bearing which maintains the rolling contact surfaces of the rollers in adequate contact with the raceway surfaces of the inner and outer rings, maintains the end surfaces of the rollers in adequate contact with the surface of the rib, produces only small frictional resistance, and exhibits excellent torque characteristics and excellent initial heat generation characteristics.

The above object is achieved in accordance with the teachings of the present invention by a radial roller bearing comprising an inner ring, an outer ring, and a plurality of rollers disposed between the rings and a retainer for the rollers, the bearing being characterized in that: (1) at least one of the surfaces of a raceway surface of the inner ring, a raceway surface of the outer ring and the rolling contact surfaces of the rollers is crowned so that the amount of crowning is 0.0007 to 0.002; (2) one end surface of each roller is formed spherically convex; (3) at least one of the elements of the inner ring and outer ring is provided with a rib at its one end, the rib being opposite to the end surface of each roller; and (4) the surface of the rib which makes contact with the end surface of each roller is spherically concave.

The aforementioned amount of crowning is the ratio of the depth of crowning $\Delta t$ to the effective roller length $l$. Only the rolling contact surfaces of the rollers may be crowned, or only the inner or outer ring may be crowned, or only inner and outer rings may be crowned. Alternatively, all elements may be crowned, in which case the amount of crowning is the sum of the amount of crowning on the rolling surfaces and the amount of crowning on inner and outer rings. When the amount of crowning lies in the range of from 0.0007 to 0.002, the frictional resistance between the rolling contact surfaces of the rollers and the ring is small. Also, formation of a thick film of lubricating oil on the contacting portions can be circumvented. This improves the torque characteristics and the heat generation characteristics.

The radius of curvature of the spherically convex surface of the rib is preferably at least twice as large as the radius of curvature of the spherically concave surface of the end surfaces of the rollers facing the rib. This reduces the frictional resistance between the end surfaces of the rollers and the surface of the rib. Consequently, the torque characteristics and heat generation characteristics are improved.

The roughness of the surface of the rib which is opposite to the end surfaces of the rollers is preferably set less than 0.4 $\mu$m. If so, the surface of the rib forms a substantially specular surface, and the coefficient of friction of the rib surface with respect to the end surfaces of the rollers is small. This reduces the frictional resistance between the end surfaces of the rollers and the rib surface. As a result, the torque characteristics and the heat generation characteristics are improved further.

BRIEF DESCRIPTION OF THE DRAWINGS

FIG. 3 is a graph showing the results of an experiment on the relation of torque to rotational speed.

DESCRIPTION OF THE PREFERRED EMBODIMENT

Figure 1:
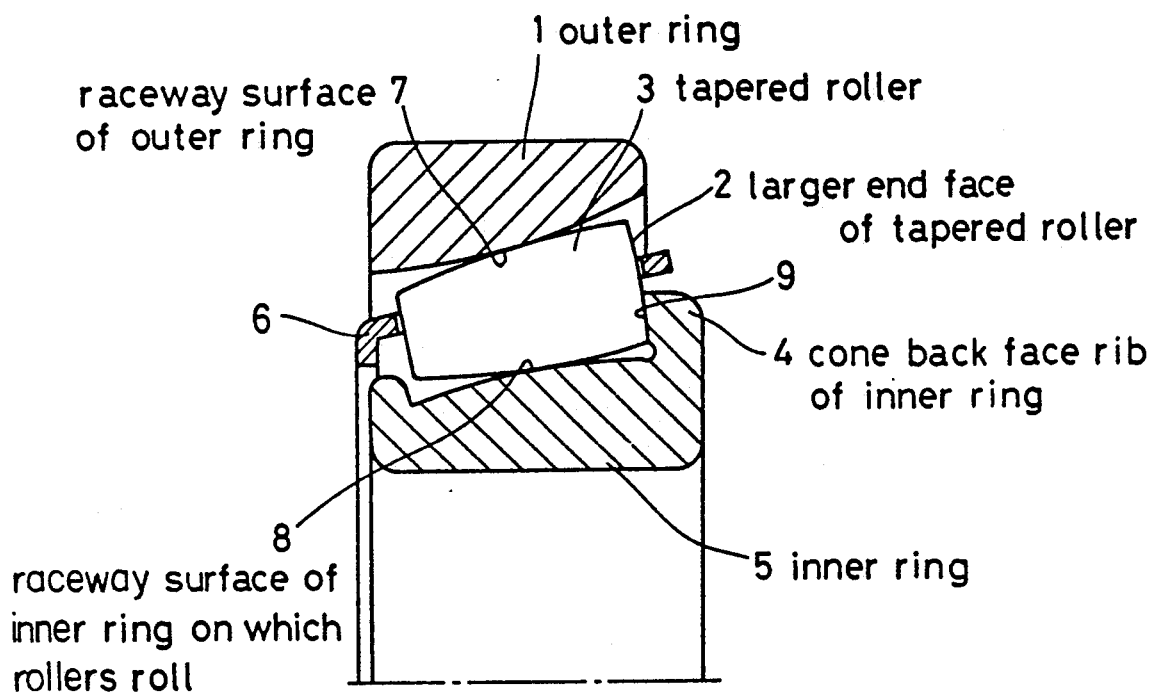
FIG. 1 is a vertical cross section of the upper half of a tapered roller bearing according to the invention.
Figure 2:
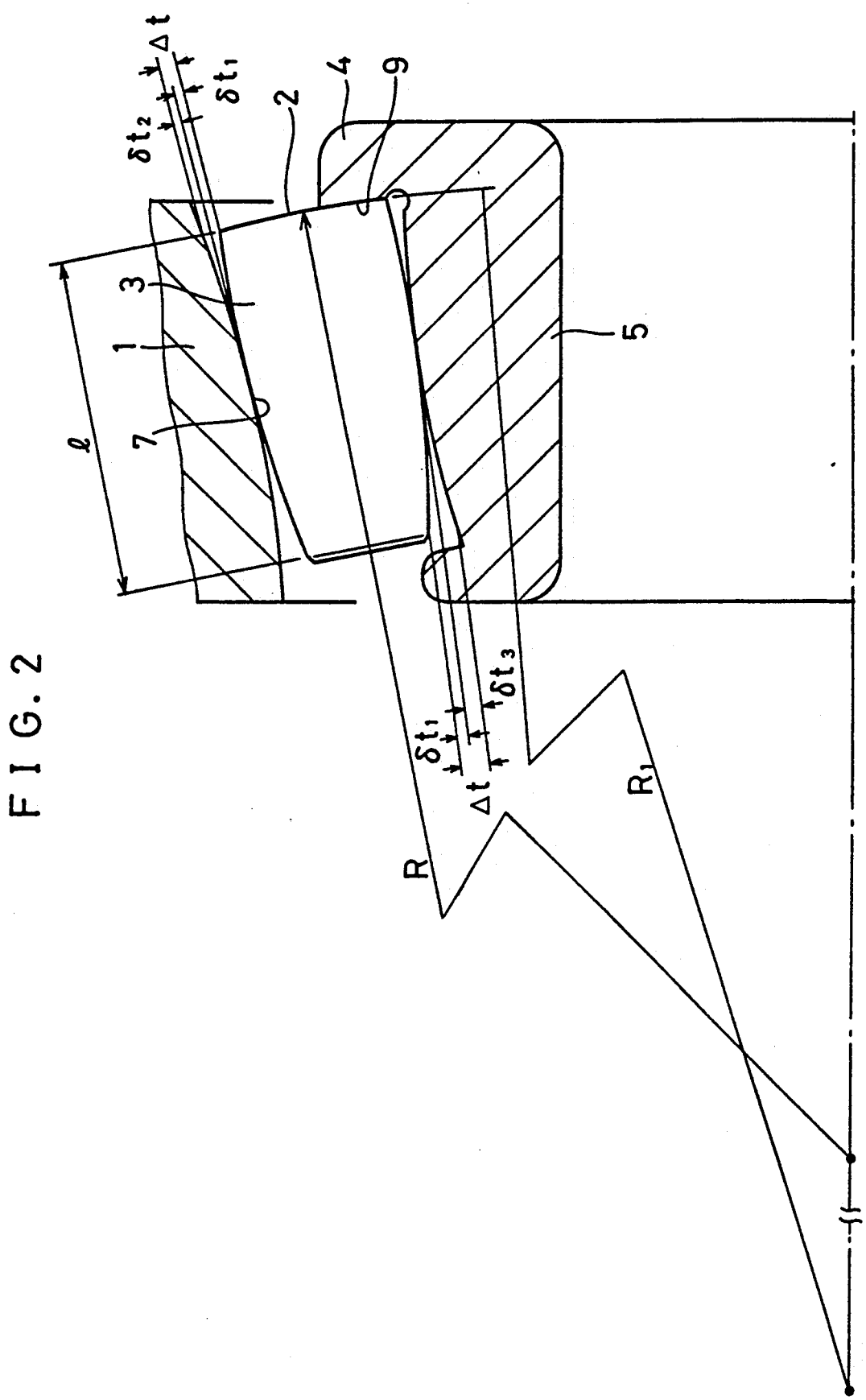
FIG. 2 is a view similar to FIG. 1, but illustrating the amount of crowning utilized in the invention.

A tapered roller bearing according to the invention is next described in detail by referring to FIGS. 1-4. In FIGS. 1 and 2, crowning is exaggerated for clarity. The tapered roller bearing comprises an outer ring 1 having a substantially triangular cross section, a plurality of tapered rollers 3, an inner ring 5 having a substantially triangular cross section, and retainers 6 which rotatably hold their respective rollers 3. The larger end surface 2 of each roller 3 is spherical. The inner ring 5 has a rib 4 on the outer periphery having a larger diameter, the rib extending radially outwardly.

The rollers 3 roll on the raceway surface 7 of the outer ring 1 and on the raceway surface 8 of the inner ring 5. These raceway surfaces 7 and 8 are continuously crowned substantially over their whole axial length. The rolling contact surface of each roller 3 is continuously crowned over its whole effective length.

With respect to the crowning on the outer ring 1, the inner ring 5, and the tapered rollers 3, the amount of crowning which is defined as $\Delta t/l$ is set to 0.0007 to 0.002 (mm/mm). In this expression, $\Delta t$ is the sum of the depths of crowning of the axial ends of the raceway surfaces 7 and 8 which define the ends of the effective length of each tapered roller, and $l$ is the effective length of each tapered roller 3. The sum $\Delta t$ of the depths of crowning is the sum of the depth of crowning $\delta t_1$ of each tapered roller 3 and the depth of crowning $\delta t_2$ (or $\delta t_3$) of the outer ring 1 (or the inner ring 5), as shown in FIG. 2.

The inner surface 9 of the rib 4 of the inner ring 5 is concave and has a radius of curvature $R_1$ which is preferably 2 to 10 times as large as the radius of curvature $R$ of the larger end face 2 of each tapered roller 3. It is desired to form the roughness of the inner surface 9 less than 0.4 $\mu$m.

The relation of the torque applied to the novel tapered roller bearing to the rotational speed is shown in FIG. 3, where the torque is plotted on the vertical axis and the rotational speed on the horizontal axis. The tapered roller bearing subjeted to an experiment had a 35 mm inner diameter, 80 mm outside diameter, and 32.75 mm overall width. The effective length l of each tapered roller 3 was set to 15 mm. The depth of crowning $\Delta t_1$ of the axial end of each roller 3 which defines one end of the effective length of the roller was set to 5 $\mu$m. The depth of crowning $\delta t_2$ of the outer ring 1 and the depth of crowning $\delta t_3$ of the inner ring 5 were set to 15 $\mu$m. The sum $\Delta t$ of the depths of crowning was set to 20 $\mu$m. The amount of crowning was set to 0.0013. The radius of curvature $R_1$ of the inner surface 9 of the rib was 4 times as large as the radius of curvature $R$ of the larger end surface 2 of each tapered roller 3. The roughness of the inner surface 9 was set to 0.4 $\mu$m.

In the experiment, the thrust load was 400 kg.f, and the rotational speed was 0 to 4000 rpm. The used lubricating oil was 85W-90 (20° C).

The graph shows the data obtained from four types of radial roller bearings A-D. Bearing A is crowned as described above, and the rib is designed as described above. Bearings B-D are merely crowned, and their rib are not designed as described above. The sum $\Delta t$ of the depth of crowning of bearing B is 4 $\mu$m. The sum $\Delta t$ of bearing C is 40 $\mu$m. The sum $\Delta t$ of bearing D is 20 $\mu$m.

The results of experiments made of bearings B-D show that an appropriate region exists for the amount of crowning. It can be seen that the bearing A needs less torque than bearing D which is identical to bearing A in sum of depths of crowning.

More specifically, with respect to bearing D, the sum $\Delta t$ of depths of crowning is set to 20 $\mu$m. In this case, the frictional resistance between each tapered roller 3 and the surfaces of the race surface on which the rollers roll is reduced. An appropriate film of lubricating oil is created between each roller 3 and the race surface and so the viscous resistance is small. In this way, the foregoing results are obtained. Bearing A is crowned in the same way as bearing D. In addition, the inner surface 9 of the rib 4 is designed as described above. Therefore, the whole rolling contact surface of each roller 3 makes contact with the whole inner surface 9 of the rib, thus reducing the coefficient of friction. This leads to a reduction in the torque as mentioned above. If each roller 3 of bearing A is skewed because of error introduced in machining the roller 3 and the contact surfaces of the race, the sliding friction between the inner surface 9 of the rib 4 and each roller 3 is prevented from increasing. Hence, the desired results arose as illustrated.

Figure 4:
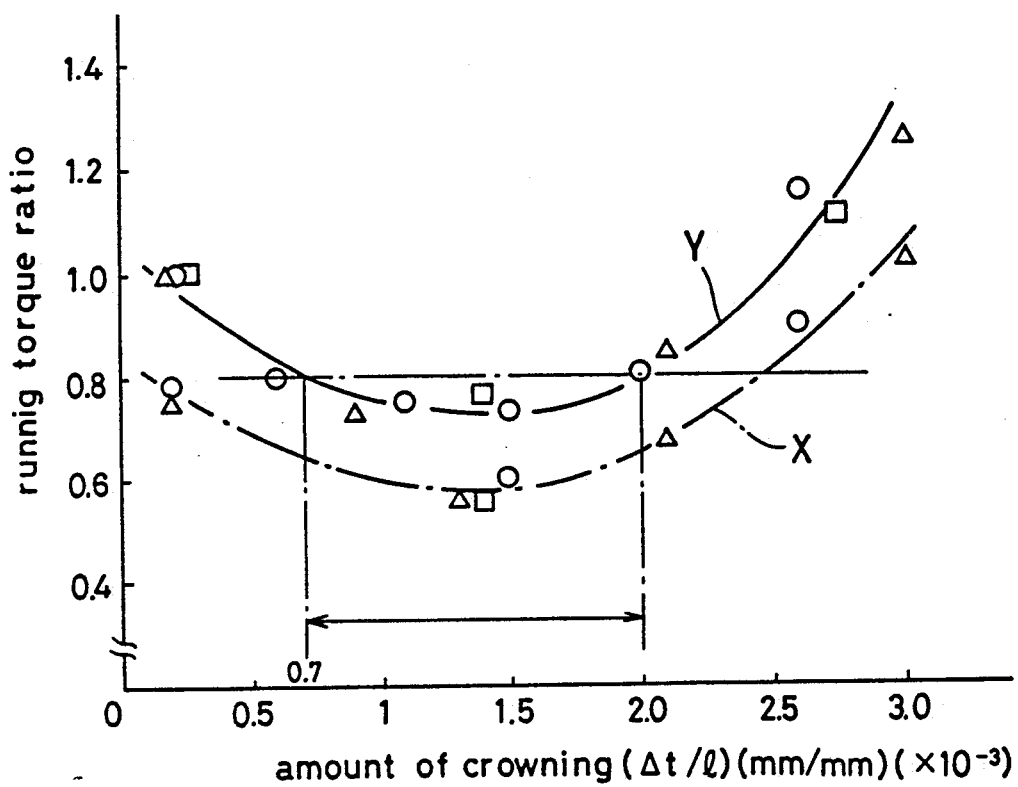
FIG. 4 is a graph showing the results of an experiment on the relation of torque ratio to amount of crowning.

FIG. 4 shows the relation of torque to amount of crowning. In this graph, the amount of crowning ($\Delta t/l$) is plotted on the horizontal axis and torque ratio on the vertical axis. The torque ratio is set to 1 for the bearing which is set to 1 for the bearing which is only crowned, i.e., the rib of the rings is not disigned as described above. Curve X shows average data derived from bearings which are crowned and whose rib are disigned as described above. Curve Y indicates average data obtained from bearings which are crowned but their ribs are not designed as described above. The average data was collected from three kinds of bearings having different sizes, these kinds being indicated by O, $\Delta$, and $\square$, respectively.

As can be seen from the results of experiments indicated by curves X and Y, the structure which is crowned and whose rib is designed in accordance with the invention provides much lower running torque ratio than the structure that is only crowned. In any case, the torque realizes its minimum value when the amount of crowning is set to about $1.4 \times 10^{-3}$. Torque increases whether the amount of crowning is over or below this value. From these results, the range of the amount of crowning has been determined.

As described thus far, the frictional resistance between each tapered roller 3 and the contact surfaces of the inner and outer rings can be reduced by the above-described crowning. If the rollers are skewed due to error occurring in machining the bearing, the sliding friction between each roller 3 and the inner surface 9 of the rib of the race way can be prevented from increasing by designing the rib as described already. That is, these two countermeasures combine to reduce the whole torque and to suppress temperature rise.

In the illustrated example, all of the tapered rollers 3, the outer ring 1, and the inner 5 are crowned. The present invention is not limited to this scheme, but rather any of the six combinations listed in the following table can be adopted.

TABLE

|  | 1 | 2 | 3 | 4 | 5 | 6 |
|---|---|---|---|---|---|---|
| rollers |  |  |  |  |  |  |
| inner ring |  |  |  |  |  |  |
| outer ring |  |  |  |  |  |  |

( indicates crowning)

Also, the invention is not restricted to the illustrated tapered roller bearing. Obviously, it can also be applied to a cylindrical roller bearing.

What is claimed is:

1. A radial roller bearing comprising:
a inner ring;
a outer ring; and a plurality of rollers disposed between said rings and a retainer for said rollers;

at least one surface of raceway surfaces of said inner ring, a raceway surface of said outer ring and rolling contact surfaces of said rollers being crowned so that the amount of crowning is 0.0007 to 0.002;

one end surface of each roller being formed spherically convex;

at least one of elements of said inner ring and said outer ring being provided with a rib at its one end opposed to a convex end surface of each roller, said convex end surface of each roller being in contact with said rib, said contact surface of said rib being formed spherically concave in contact with said convex end surface of each roller.

2. The radial roller bearing of claim 1, wherein said radial roller bearing is a tapered roller bearing.

3. The radial roller bearing of claim 1, wherein the rolling contact surfaces of the rollers, the raceway surface of the outer ring and the raceway surface of the inner ring are all crowned.

4. The radial roller bearing of claim 1, wherein said spherically concave surface of said rib has a radius of curvature twice as large as a radius of curvature of said spherically convex end surface of each roller.

5. The radial roller bearing of claim 1, wherein a surface roughness of said rib which is opposite to said convex end surface of each roller is formed less than 0.4 μm.

* * * * *